Figure 1:
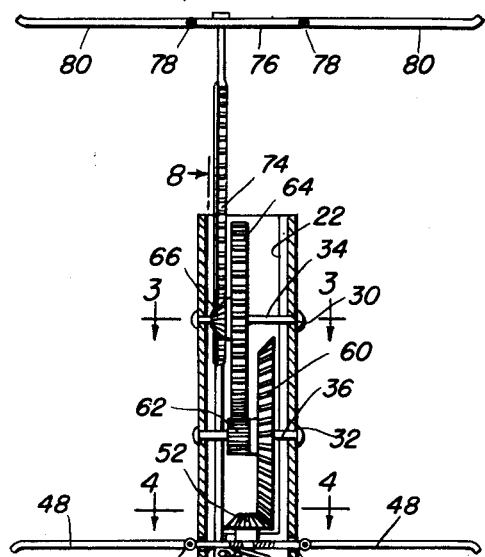

June 13, 1950 — P. C. HUTTON — 2,510,978
MECHANICAL POWER UNIT
Filed Nov. 20, 1947 — 4 Sheets-Sheet 1

Paul C. Hutton
INVENTOR.

BY *Clarence A. O'Brien
and Harvey B. Jacobson*
Attorneys

June 13, 1950 P. C. HUTTON 2,510,978
MECHANICAL POWER UNIT
Filed Nov. 20, 1947 4 Sheets-Sheet 2

Paul C. Hutton
INVENTOR.

BY *Clarence A. O'Brien
and Harvey B. Jacobson*
Attorneys

June 13, 1950 P. C. HUTTON 2,510,978
MECHANICAL POWER UNIT
Filed Nov. 20, 1947 4 Sheets-Sheet 3
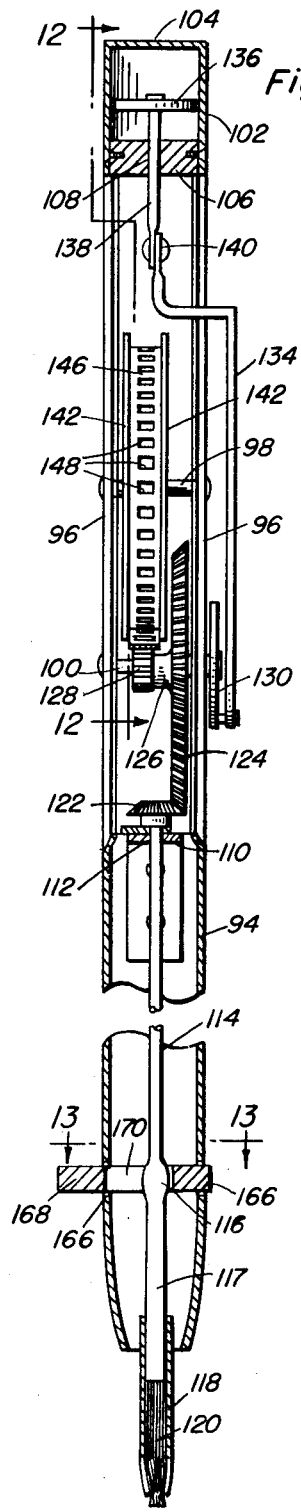
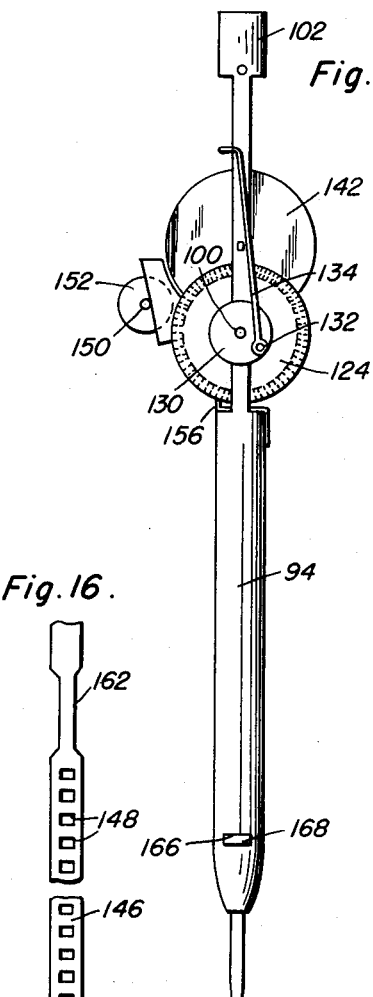
Paul C. Hutton
INVENTOR.
BY Clarence A. O'Brien
and Harvey B. Jacobson
Attorneys June 13, 1950 P. C. HUTTON 2,510,978
MECHANICAL POWER UNIT
Filed Nov. 20, 1947 4 Sheets-Sheet 4
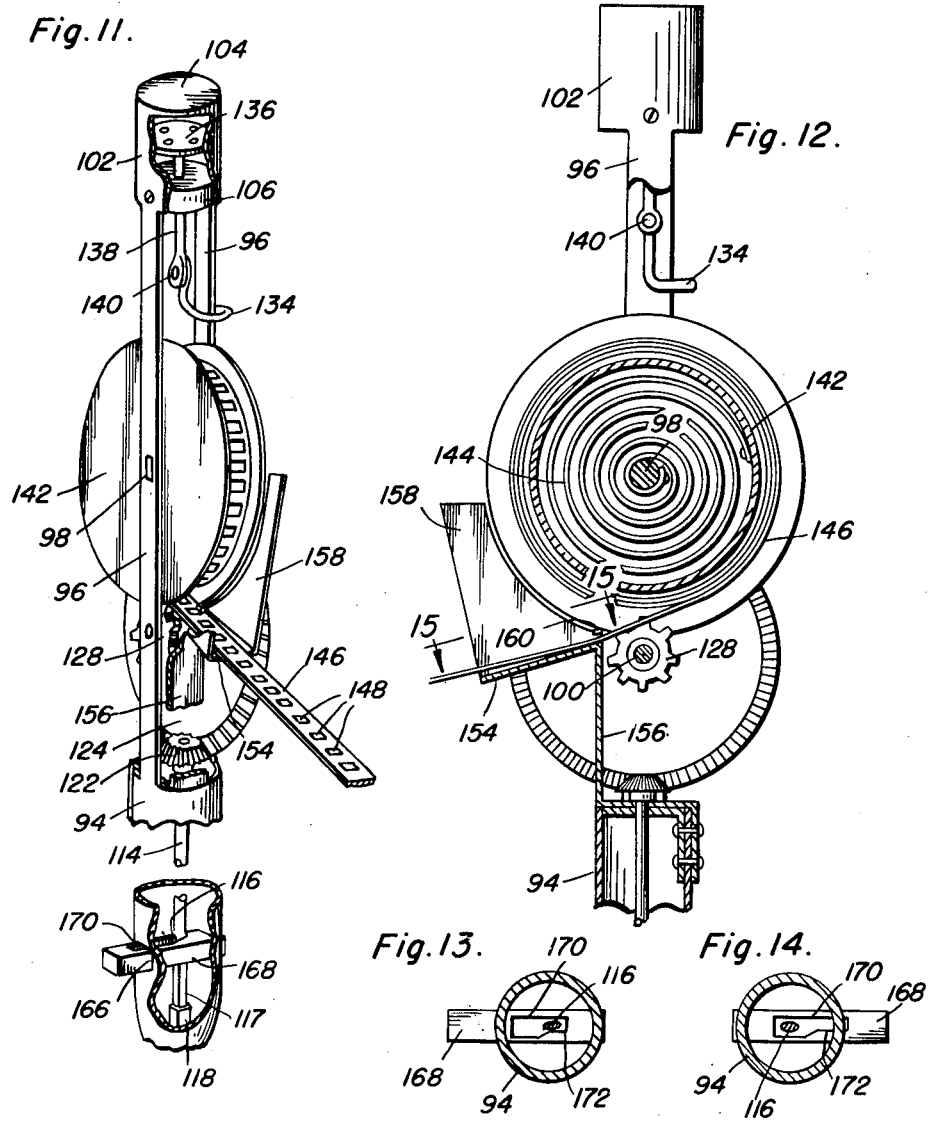
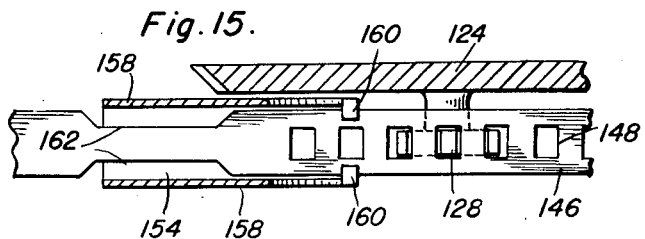
Paul C. Hutton
INVENTOR.

Patented June 13, 1950

2,510,978

UNITED STATES PATENT OFFICE 2,510,978

MECHANICAL POWER UNIT

Paul C. Hutton, Washington, D. C.

Application November 20, 1947, Serial No. 787,076

2 Claims. (Cl. 185—37)

This invention relates to a mechanical power unit, and more particularly to the type of device illustrated and described in Patent No. 2,420,825 issued to me on May 20, 1947.

The primary object of the invention is to store energy in a spring and to convert the energy so stored into rotary motion for various purposes, such as driving an eraser, operating a small drill, or for any other purpose where rotary motion may be employed or desired.

Another object is to facilitate the periodic storage of the energy in the spring for repeated operation and to govern the rapidity with which the energy stored in the spring may be dispensed.

A further object is to arrest or free the rotary elements of the device while the latter is held in the hand of the user, and also to utilize the energy of the arm movements of the user in storing the energy in the spring.

The above and other objects may be attained by employing this invention which embodies among its features an elongated tubular housing, a shaft mounted in the housing to rotate about the longitudinal axis thereof, spring actuated means carried by the housing for rotating the shaft, governing means carried by the housing to retard the rapidity with which the shaft rotates, and means on one end of the shaft to support a rotary eraser or the like thereon for rotation therewith.

Other features include means movable in a rectilinear path away from the housing to energize the spring of the spring actuating means and governing means carried by the housing to retard the rapidity with which the shaft rotates.

Still other features include manually releasable means normally arresting rotation of the shaft.

In the drawings:

Figure 1 is a side view of a mechanical power unit embodying the features of this invention and showing it equipped with a rotary eraser.

Figure 2:
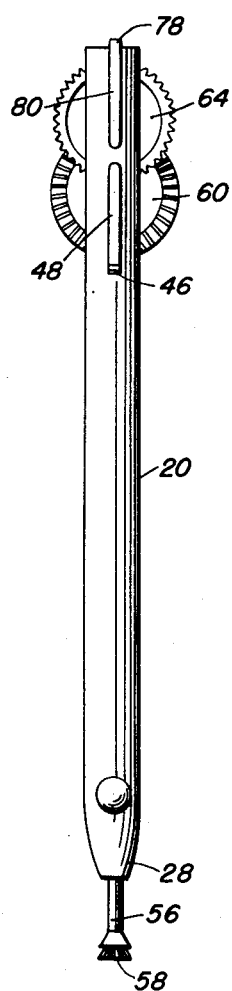
Figure 2:
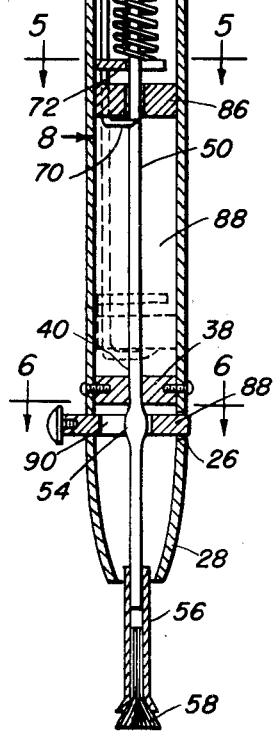
Figure 3:
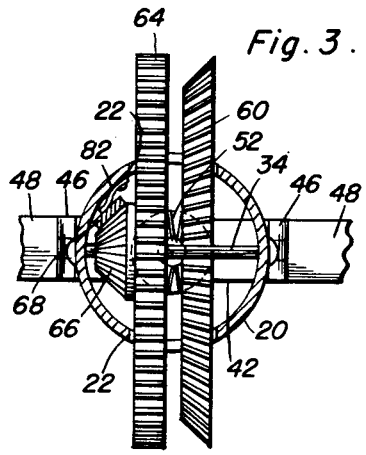
Figure 4:
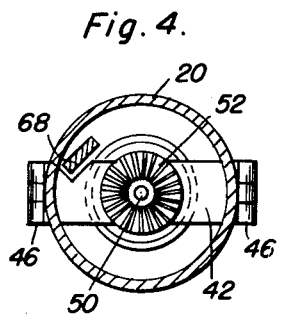
Figure 5:
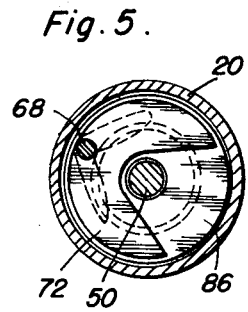
Figure 6:
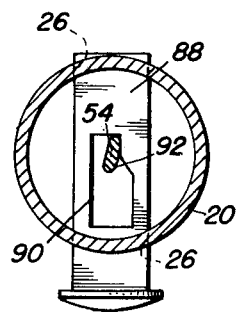
Figure 8:
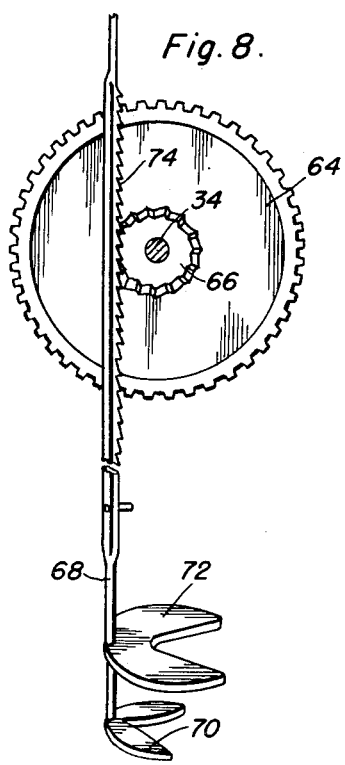
Figure 7:
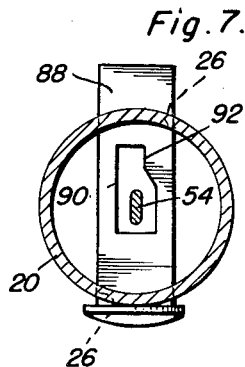

Figure 2 is an enlarged sectional view through the device taken in a plane perpendicular to the plane in which Figure 1 is viewed, Figure 3 is an enlarged sectional view taken substantially along the line 3—3 of Figure 2, Figure 4 is an enlarged sectional view taken substantially along the line 4—4 of Figure 2, Figure 5 is an enlarged sectional view taken substantially along the line 5—5 of Figure 2, Figure 6 is an enlarged transverse sectional view taken substantially along the line 6—6 of Figure 2, Figure 7 is a view similar to Figure 6 showing the push button in shaft releasing position, Figure 8 is a fragmentary enlarged sectional view taken substantially along the line 8—8 of Figure 2, Figure 9 is a view similar to Figure 1 illustrating a modified form of the invention, Figure 10 is an enlarged vertical sectional view through the device of Figure 9 taken in a plane substantially perpendicular to the plane in which Figure 9 is viewed, Figure 11 is an enlarged fragmentary perspective view of the invention illustrated in Figures 9 and 10, Figure 12 is an enlarged sectional view taken substantially along the line 12—12 of Figure 10, Figure 13 is a horizontal sectional view taken substantially along the line 13—13 of Figure 10, Figure 14 is a view similar to Figure 13 showing the push button in a position to free the shaft for rotation, Figure 15 is a fragmentary sectional view taken substantially on the line 15—15 of Figure 12, and Figure 16 is a fragmentary plan view of the tape or ribbon showing it extended.

Referring to the drawings in detail a tubular housing 20 is provided adjacent one end with diametrically opposed elongated longitudinal slots 22 which open outwardly through the adjacent end of the tubular body. Formed in the body 20 near the inner ends of the elongated longitudinal slots 22 are diametrically opposed transversely extending slots 24, the axis of which lie perpendicular to the plane of the axes of the slots 22 as will be readily understood upon reference to Figure 2. Formed adjacent the end of the body 20 remote from that through which the slots 22 enter are diametrically opposed aligning slots 26, the axes of which lie parallel to the axes of the slots 24 previously mentioned and the wall of the body between the slots 26 and the adjacent end of the body converge to form a tapered portion 28. Formed in the legs of the body formed by the slots 22 in longitudinally spaced relation are diametrically opposed openings 30 and 32, the axes of which lie parallel to the axes of the openings 24 for the reception of axle shafts 34 and 36 respectively the purpose of which will more fully hereinafter appear. A head 38 extends transversely of the body adjacent the aligned openings 26 on the side remote from the tapered portion 28, and this head is provided with an axial opening 40 through which the eraser drive shaft to be more fully hereinafter explained is mounted to rotate.

Extending transversely through the aligned slots 24 in the body 20 is a plate 42 having an axial opening 44 which aligns with the opening 40 in the head 38, and carried at opposite ends of the plate 42 on the outside of the body 20 are hinge barrels 46 to which are hingedly coupled folding grip members 48 which are adapted to fold upwardly against opposite sides of the body 20 as illustrated in Figure 1. The hinge members 46 are so arranged that when the grip members 48 are unfolded as illustrated in Figure 2, they will be held in a position to lie along an axis which lies perpendicular to the longitudinal axis of the body.

Mounted for rotation in the aligning openings 40 and 44 about the longitudinal axis of the elongated tubular body 20 is a shaft 50, and fixed to the shaft adjacent the end which projects through the opening 44 is a bevel drive pinion 52. The portion of the shaft which projects through the opening 40 is flattened as at 54, and as illustrated the end of the shaft projects through the tapered end 28 of the tubular housing 20 and carries a suitable sleeve 56 in which a rotary eraser 58 is supported. This eraser may be of conventional form or may be constructed of glass fibers or the like according to the desires of the user.

Mounted for rotation on the shaft 36 is a bevel gear 60 having meshing engagement with the pinion 52, and carried by the hub of the gear 60 is a spur pinion 62 which has meshing engagement with a spur gear 64 which is mounted to rotate on the shaft 34. The hub portion of the gear 64 is provided with a ratchet toothed bevel pinion 66, the purpose of which will be more fully hereinafteer explained.

Mounted in the housing 20 for vertical sliding movement parallel with the shaft 50 is a pull rod 68 which is provided at its extreme lower end with a forked member 70, the purpose of which will be more fully hereinafter described. A forked follower plate 72 is carried by the rod 68 near the inner end of the rod but in spaced parallel relation to the forked member 70, and formed near the opposite end of the rod is a flattened portion carrying ratchet teeth 74 which are adapted to mesh with the teeth of the ratchet pinion 66 as will be readily understood upon reference to Figure 8. A cross member 76 is fixed to the end of the pull rod 68 remote from the forked member 70 and hingedly connected as at 78 to opposite ends of the cross member 76 are grips 80 which are adapted to cooperate with the grips 48 in forming hand holds by which the parts may be grasped in the hands of the operator for exerting pull on the pull rod 68 relative to the housing 20. A suitable leaf spring 82 is fixed to one of the legs formed on the body by the slots 22 and bears against the pull rod 68 to yieldingly urge the teeth 74 thereon into engagement with the teeth of the pinion 66.

Surrounding the shaft 50 and bearing at one end against the underside of the plate 42, and at its opposite end on the forked follower plate 72 is a compression coil spring 84, and fixed to the forked member 70, and forming a tight fit within the tubular body 20 is a movable plunger 86, which cooperates with the head 38 in compressing air within a chamber 88 formed in the housing 20 between the head 38 and the plunger 86. It will thus be seen that as the rod 68 is moved under the influence of the spring 84 the speed of movement will be governed by the rapidity of the escape of air which is being compressed in the chamber 88 around the shaft 50.

Mounted for sliding movement through the aligned openings 26 is a push rod 88 having formed therein an elongated longitudinal slot 90 one wall 92 of which is inwardly offset for engagement with the flattened portion 54 of the shaft 50 when it is desired to arrest rotation of the shaft. It will thus be seen that by sliding the push member 88 transversely through the slots 26, rotation of the shaft 50 may be stopped or started at the will of the user.

In employing this embodiment of my invention the user grasps the grips 48 and 80 which have been extended into the position illustrated in Figure 2, and exerts pull on the pull rod 68 to move the follower toward the plate 42 and compress the spring 84. Such movement simultaneously retracts the plunger 86 from the head 38 so as to draw air into the chamber 88 through the opening 40 around the shaft 50. During this compressing motion of the spring, the teeth 74 will ratchet harmlessly over the teeth of the pinion 66 so as to avoid rotating the gear train and the shaft. With the spring 84 fully compressed, it will be evident that its energy will be exerted on the follower plate 72 so as to exert pull on the pull rod 68 and impart rotary motion to the gear train through the meshing of the teeth 74 with the teeth of the pinion 66, thus driving the shaft 50, and rotating the eraser 58. Rotation of the shaft is governed by exerting pressure on either end of the push plate 88 so as to move the offset portion 92 of the wall of the slot 90 into or out of position to intercept the flattened portion 54 of the shaft 50 and arrest motion of the shaft. In this way the movements of the shaft may be easily controlled by the operator. Obviously as the plunger 86 moves toward the head 38 under the influence of the spring 84 the air confined in the chamber 88 will be compressed so that the rapidity with which the spring expands is retarded in direct proportion to the rapidity with which the air escapes from the chamber 88, and hence the speed of rotation of the shaft 50 is governed.

In the modified form of the invention illustrated in Figures 10 through 14 inclusive a tubular housing 94 is provided adjacent one end with a pair of diametrically disposed parallel longitudinally extending arms 96 intermediate the ends of which is fixed a shaft 98. A similar shaft 100 extends between the arms 96 substantially midway between the shaft 98 and the end of the housing 94, and carried at the extreme ends of the arms 96 remote from the housing 94 is a cylinder 102 the end of which remote from the arms 96 is closed by a head 104, while the opposite end of the cylinder 102 has fitted therein a plug 106 having an axial opening 108 therein which aligns with the axis of the tubular housing 94. A bracket 110 extends transversely across the end of the housing 94 adjacent the arms 96 and is provided with an axial opening 112.

Mounted for rotation through the axial opening 112 in the bracket 110, and about the longitudinal axis of the housing 94 is a shaft 114, the lower end of which is flattened as at 116 and carries a rectangular portion 117 which extends beyond the end of the housing 94 remote from the arms 96 to receive a sleeve 118 in which a suitable eraser 120 is held. The end of the shaft 114 remote from the flattened portion 116 has fixed thereto a bevel drive pinion 122 which has meshing engagement with a bevel gear 124 which is mounted for rotation on the shaft 100. The hub 126 of the gear 124 carries a toothed wheel 128, the purpose of which will be more fully hereinafter explained. Carried by the hub 126 of the wheel 124 adjacent the end remote from the toothed wheel 128, is a crank disc 130 carrying an eccentric pin 132 to which one end of a connecting rod 134 is coupled. Mounted for longitudinal sliding movement in the cylinder 102 is a piston 136, the piston rod 138 of which projects through the opening 108 in the plug 106 and has pivotally connected thereto as at 140 the opposite end of the connecting rod 134. It will thus be seen that as the gear 124 rotates to drive the pinion 122 and the shaft 114, the piston 36 will be reciprocated in the cylinder 102, to compress the air in opposite ends of the cylinder and hence retard the speed with which the gear 124 and shaft 114 are driven.

Mounted for rotation on the shaft 98 is a spring loaded drum 142, and fixed to the shaft 98 within the drum 142 is one end of a spiral spring 144, the opposite end of which is riveted or otherwise fixed to the drum so that when the drum is rotated in one direction, the spring will be energized. Attached at one end to the drum 142 is a tape or ribbon 146 which is so arranged that when the drum rotates under the influence of the spring 144, the ribbon will be wound on the drum. The ribbon 146 is provided with a longitudinal row of longitudinally spaced openings 148 in which the teeth of the wheel 128 engage, so that as the drum 142 rotates under the influence of the spring 144, the gear 124 will be driven to cause the shaft 114 to rotate.

The ribbon or tape 146 is of the self-winding type, that is it is so tensioned as to tend to wind upon itself, and the end of the tape or ribbon 146 remote from that which is connected to the drum 142 is fixed to a shaft 150 carrying spaced parallel disks 152 which cooperate with the shaft in forming a reel or magazine upon which coils that portion of the tape which is not wound upon the drum. A suitable ribbon guide 154 is carried by a bracket 156 and extends outwardly in a direction perpendicular to the axis of the drum 142. The ribbon guide 154 is provided along opposite side edges with upstanding flanges 158 the outer edges of which are adapted to be engaged by the projecting ends of the shaft 150 when the tape is wound thereon between the disks 152 in order to support the tape magazine in proper position during the winding of the tape on the drum 142. Formed at the ends of the flanges 158 adjacent the sprocket or toothed wheel 128 are inwardly projecting guide tongues 160 which as shown partially overlie the top surface of the ribbon 146 adjacent its opposite side edges in order to hold it in engagement with the teeth of the sprocket or toothed wheel 128 during the normal operation of the device. In order that the ribbon or tape may be disengaged from the sprocket during the winding of the spring 144, the ribbon is provided in its side edges adjacent the end remote from that which is attached to the drum 142 with oppositely disposed notches 162 through which the guide tongues 160 may pass. When the drum has been fully wound, the notches 164 adjacent the end which is attached to the drum 142 will align with the guide tongues 160 so that the ribbon 142 may be re-engaged with the sprocket or toothed wheel 128 and the device made ready for use under the influence of the energy stored in the spring.

In order to provide a manual control for arresting rotation of the shaft 114, the tubular housing 94 is provided near the end remote from the bracket 110 with diametrically opposed aligning openings 166 through which a push bar or member 168 is slidable. Like the push member 88 previously described this push member 168 is provided with an elongated longitudinal slot 170 having an offset portion 172 which when the push member is in position is adapted to engage the flattened portion 116 of the shaft 114, to arrest rotation of the shaft.

In using this embodiment of my invention, the energy is stored in the spring 144 by exerting pull on the shaft 150 to which the tape or ribbon 148 is coupled. The fingers are hooked around the projecting ends of the shaft 150 and the tubular body 94 is grasped in the opposite hand. The tape 146 is then disengaged from the sprocket 128 so that upon moving the parts away from one another along a rectilinear path the tape 146 will be uncoiled from its position about the drum 142, thus energizing the spring 144. With the spring thoroughly energized, the tape is re-engaged with the sprocket 128 and upon releasing pull on the shaft 150, the tape will coil itself upon the shaft 150 between the flanges 152. Upon moving the push member 166 to free the shaft 114 for rotation, it is obvious that the engagement of the teeth of the wheel 128 in the openings 148 in the ribbon or tape 146 will rotate the gears 124 and 122 by the effort of the spring 144 to wind the tape on the drum 142 and cause the shaft 114 to be driven. Too rapid rotation of the shaft is governed by movements of the piston 136 in the cylinder 102, and rotation of the shaft may be arrested by moving the offset portion 172 of the push member 168 into a position to engage the flattened portion 116 of the shaft. Hence by shifting the position of the push member 168 back and forth through the slots 166 it is evident that the rotation of the shaft 114 may be stopped or started under the direct control of the operator.

While in the foregoing there has been shown and described the preferred embodiment of this invention it is to be understood that minor changes in the details of construction, combination and arrangement of parts may be resorted to without departing from the spirit and scope of the invention as claimed:

Having described the invention, what is claimed as new is:

1. A mechanical power unit which includes an elongated tubular housing, a shaft mounted in the housing to rotate about the longitudinal axis thereof, one end of the shaft projecting beyond one end of the housing for coupling to an eraser or the like, a gear train carried by the housing and having driving connection with the shaft, a toothed pull rod movable longitudinally through one end of the housing and having meshing engagement with a gear of the gear train, a compression coil spring encircling the shaft within the housing, and means carried by the pull rod adjacent the inner end thereof for engaging the spring and compressing it as the pull rod is moved in a rectilinear path away from the housing.

2. A mechanical power unit which includes an elongated tubular housing, a shaft mounted in the housing to rotate about the longitudinal axis thereof, one end of the shaft projecting beyond one end of the housing for coupling to an eraser or the like, a gear train carried by the housing and having driving connection with the shaft, a toothed pull rod movable longitudinally through one end of the housing and having meshing engagement with a gear of the gear train, a compression coil spring encircling the shaft within the housing, means on the pull rod adjacent the inner end thereof for engaging the spring and compressing it as the pull rod is moved in a rectilinear path away from the housing, a plug in the housing adjacent the end thereof remote from the gear train to retard the escape of air from said housing and a piston carried by the pull rod adjacent the inner end thereof and movable in unison therewith for compressing air within the housing and against the plug to produce a cushion against which the force of the spring is exerted.

PAUL C. HUTTON.

REFERENCES CITED

The following references are of record in the file of this patent:

UNITED STATES PATENTS

| Number | Name | Date |
| --- | --- | --- |
| 1,283,599 | Thomas | Nov. 5, 1918 |
| 1,503,787 | Folk | Aug. 5, 1924 |
| 1,685,411 | Arnold | Sept. 25, 1928 |
| 1,961,243 | Pereira | June 5, 1934 |
| 2,259,964 | Sussman | Oct. 21, 1941 |
| 2,419,045 | Whittaker | Apr. 15, 1947 |
| 2,420,825 | Hutton | May 20, 1947 |
| 2,429,040 | Zaverl | Oct. 14, 1947 |